May 12, 1931.   C. G. BOUTRY   1,804,856
PIPE JOINT
Filed Feb. 8, 1929

Inventor
Charles Gustave Boutry
by Connolly Bros
Atty

Patented May 12, 1931

1,804,856

UNITED STATES PATENT OFFICE

CHARLES GUSTAVE BOUTRY, OF MEUDON, FRANCE

PIPE JOINT

Application filed February 8, 1929, Serial No. 338,495, and in France February 15, 1928.

This invention relates to pipe joints and is specially applicable to smooth benzol or other fluid pipe connections.

Pipe joints for smooth pipes are known which permit slight deformations of such pipes, and which are more or less fluidtight. In the course of time, these joints are impaired, particularly by benzol; on the other hand, smooth tubes which are connected by such joints are only held by the pressure of the packing rings; little by little, said rings are caused to slide under the action of vibrations; then, if the rings have moved so far as to leave the end of one tube, the two tubes are no more held in alignment, they can move from each other and an important leak occurs.

The present invention does away with these disadvantages, since, on the one hand corrosion of the packing rings by the action of benzol is eliminated due to the use of a number of superposed packing rings, made of flexible fibre, in lieu of the one packing ring commonly used. On the other hand, accidental separation of smooth pipes connected by the improved joint is prevented by the use of a helical spring which connects both tube ends and prevents any sliding motion of said ends.

Moreover, this joint is readily detachable and the various parts are not impaired by successive mounting and dismounting operations as shown by the drawings. In addition, since a good joint is ensured by using a number of superposed packing rings of flexible fibre, which are mounted, with a slight pressure, upon the adjacent tube ends, the tightness of the joint is very little influenced by intervening vibrations, said joint being capable to undergo a slight deformation.

The accompanying drawings, illustrate, by way of example, three embodiments of the invention.

Figure 1:
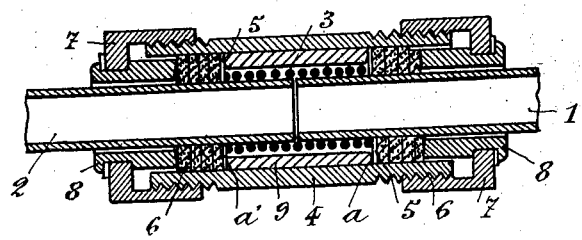
Figure 1 is a longitudinal section of a joint according to the invention.
Figure 2:
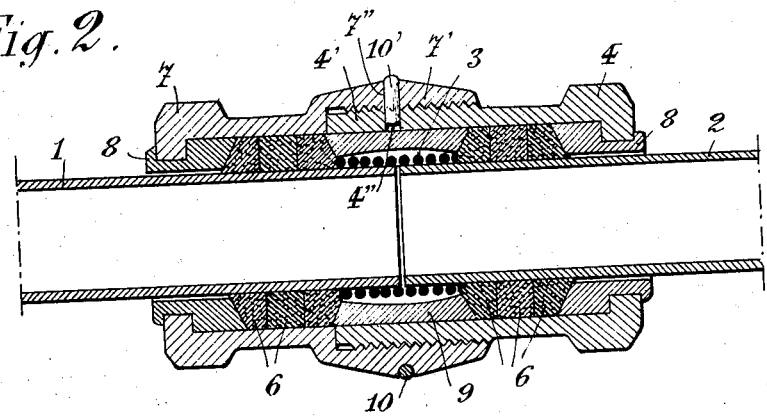
Figures 2 and 3 are longitudinal sections of two modified forms of said joint.

Referring first to Figure 1, 1 and 2 indicate the two pipes which are to be coupled; these pipe ends are held opposite each other by means of a helical spring 3, with joined helices, which is forced with a certain shrinkage, upon pipes 1 and 2. Inside an outer tube or box, of which both ends are screw threaded, is a sleeve 9. Adjacent each end $a$, $a'$ of said sleeve 9, is a hard washer or disc 5, followed by a number of flexible fibre rings 6, which constitute the packing joint proper. These rings are forced against the ends $a$, $a'$, by means of a nut 7 pressing upon said rings through the medium of a gland 8. Nut 7 and gland 8 are so assembled that they can rotate upon each other for enabling nut 7 to rotate without moving gland 8 along with it. Thus the packing rings are not impaired by a rotation of nut 8.

By considering Figure 1, it is obvious that should the joint have a tendency to slide upon one of the tubes, it would be prevented so doing by the spring 3 which would bear against one of the washers 5.

It is also seen that a pressure exerted upon the packing rings produces a slight deformation of these latter and compels them to press upon tubes 1 and 2, thereby preventing any leakage.

Referring now to Figures 2, 3 and 4, 1 and 2 are the two smooth pipe ends to be coupled together; 3 indicates the helical spring connecting the tubes; 4 is one of the packing boxes, corresponding to part of the former tube 4 and to one of the nuts 7 of Figure 1; 6 indicates the fibre rings of both tube ends; 7 is the other packing box, corresponding to the other part of tube or box 4 and to the other nut 7 of Figure 1; 8 indicates the two glands, and 9 is the spacing sleeve, against the edges of which the two sets of fibre rings bear respectively.

According to the invention, the outer box of the improved joint is made in two parts screwed upon one another and containing, the one 4, the packing gland and fibre rings of tube 2, as well as the spacing sleeve 9; the other 7, the packing gland and fibre rings fitted upon tube 1. The box 4 is provided with an outer thread 4' and the box 7 is provided with a corresponding inner thread, 7'. The dimensions of the various parts are so determined that a correct mounting, with the required pressure, is obtained by screwing home box 7 upon box 4.

The following advantages are thus obtained:

(1) A mechanic is not relied upon to judge, when tightening the joint, which amount of pressure is the most convenient.

(2) By locking the boxes one upon the other by means of a locking device (see Figure 4), which consists of an interrupted wire ring 10, around nut 7, and which penetrates with its bent end 10' into a hole 7", 4", when a re-mounting of the joint is effected, one is always sure that the holes 7" and 4" take a position substantially in prolongation of each other for the reception of the bent end of the wire ring 10.

According to another characteristic of the present modified forms, the helical spring 3, which is wound with a certain degree of shrinkage on the two tubes to be connected, is constructed with non-joined helices thereby enabling both tubes 1 and 2 to be viewed during the winding operation, and permitting to wind upon both tubes, exactly the same number of spring helices; in addition, in order to position the edges of the tube ends, a helix of the spring 3—the middle helix—which has a reduced diameter, is interposed across the gap between the adjacent pipe ends. This arrangement facilitates obviously the winding of the spring upon the tubes, since it is sufficient to bring each of these latter to bear against the respective side of the smaller diameter middle helix.

Finally, a third improvement of these modified forms, lies in the shape of the bore of the spacing sleeve 9, which bore instead of being cylindrical as in Figure 1, has a longitudinal section constituted by a curve the concavity of which is directed towards the axis of the tubes. This offers the advantage that, while leaving at the center the clearance required for the angular displacements of the tube ends, the inclined end faces of the sleeve may be thickened, so as to provide large bearing surfaces for the fibre packing rings situated at each end of the spacing sleeve.

Figure 3:
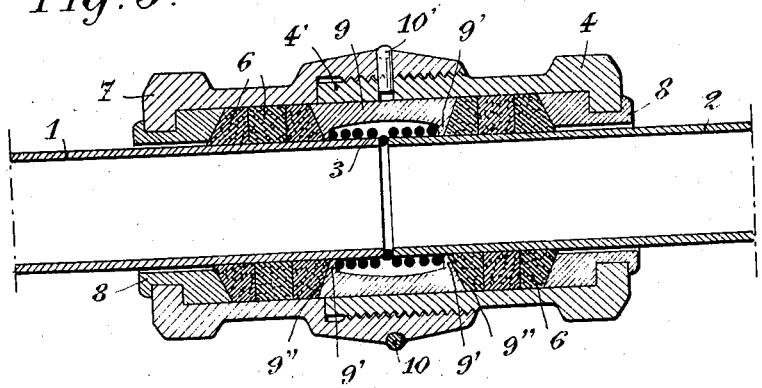
Figure 4:
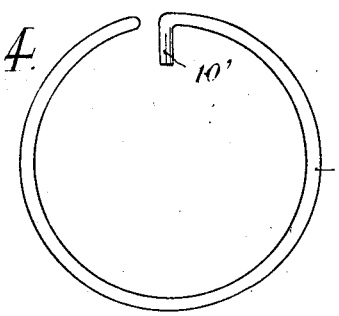
Figure 4 is a detail view of the wire ring.

The modified form illustrated in Figure 3 has precisely been so designed as to give these bearing surfaces a maximum area. To that end, the spring 3, instead of bearing by its extremities against the fibre rings of both tubes respectively, is housed in the interior of an annular recess limited at its two ends by inner shoulders 9', 9', provided at the ends of the spacing sleeve 9. As shown in Figure 3, the oblique faces 9", 9" of the sleeve bear against the whole of the corresponding inclined surface of the adjacent fibre rings. It is evident that such an arrangement improves the packing. The spring can be easily introduced into the inside of the annular recess by screwing the sleeve upon the spring.

What I claim and desire to secure by Letters Patent of the United States of America is:

1. A pipe coupling for smooth pipes, comprising a helical spring secured to the opposing ends of a pair of alined pipes, a packing box made in two sections screw threaded and coupled together and enclosing at the extremity of each section a gland and a plurality of packing discs embracing each of the pipes; a collar interposed between the innermost discs of each set, and having a bore of greater diameter than the pipes and of oval shape in longitudinal section, said collar enveloping the spring and having inwardly inclined oblique edges which abut against the adjacent packing discs having corresponding oblique faces, the glands being of greater diameter interiorly than the pipes to permit limited angular displacement of the pipes without causing leakage of the joint.

2. A coupling for smooth pipes, comprising a connection spring secured to the ends of the pipes, a packing box enclosing the spring and opposite pipe ends and composed of two sections correspondingly threaded and screwed one upon the other, a gland at each end of and embraced by the packing box, a plurality of packing rings mounted on the end of each pipe, a collar interposed between the two sets of packing rings and having an oval shaped bore in which the spring is located, said collar being formed with inwardly beveled end and having inwardly inclined flanges forming shoulders between which the spring is arranged.

3. A coupling for smooth pipes, comprising a packing box, a helical spring within the same, tightly secured to the extremities of two alined pipes, said spring comprising two sections united by an intermediate coil of less diameter than such sections and located between the ends of the pipes, said pipes and said coupling means being arranged and adapted to provide a certain amount of play between the ends of the pipes.

Dated this 12th day of January, 1929.

CHARLES GUSTAVE BOUTRY.